Patented June 23, 1931

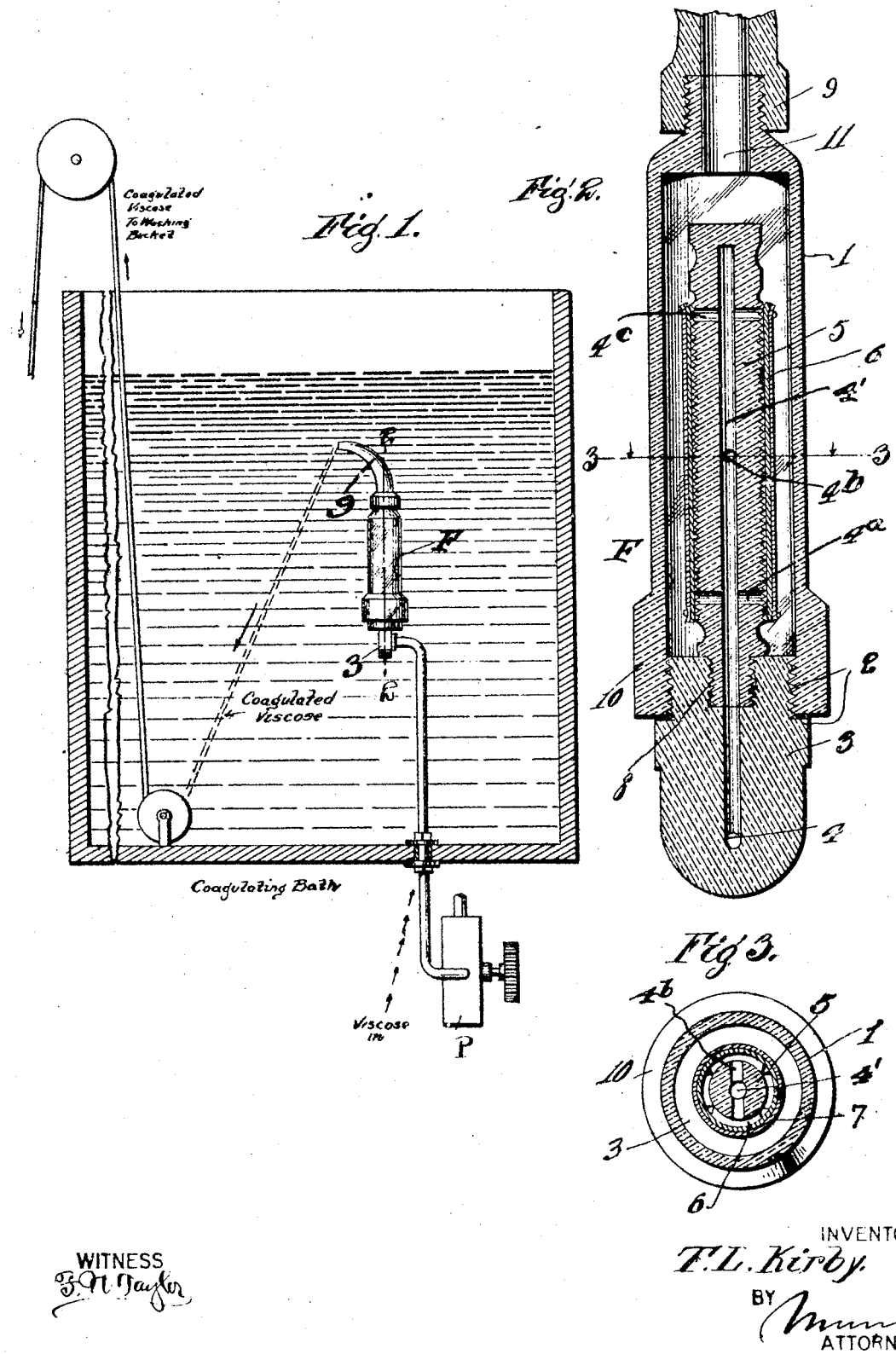

1,811,795

UNITED STATES PATENT OFFICE

THOMAS L. KIRBY, OF OLD HICKORY, TENNESSEE

FILTER FOR VISCOSE SOLUTIONS

Application filed February 1, 1927, Serial No. 165,220. Renewed April 28, 1931.

The general object of the invention is to provide a filter of the sort described, adapted to be immersed, or with lead adapter immersed, in a bath of coagulating material for viscose, so that the stream of viscose solution passing from the filter will be coagulated immediately upon its contact with the liquid of the coagulating bath.

The coagulated viscose is then passed by suitable means into a receptacle or bucket or on a bobbin whereby it is collected and washed.

A further object of the invention is to provide a structure of the sort described which will be compact, readily separated into its component parts, and will be easily cleaned.

Referring to the drawings:

Figure 1 represents a view partly in perspective and partly in section through the coagulating bath, showing the filter or adapter immersed in the solution of the coagulating bath and adapted to eject the viscose solution fed in said filter into the liquid of the bath.

Figure 2 is a diagrammatic section through the filter along line 2—2 of Figure 1.

Figure 3 is a horizontal section through the filter, taken on line 3—3, looking in the direction of the arrow.

Referring more particularly to the drawings, F represents in general the filter immersed or with the adapter immersed, in the coagulating bath, as shown, the viscose being passed to said filter by means of the pump P or a check valve, from a source not shown.

As shown in Figure 2, the filter consists of a casing indicated at 1, provided with screw threads at 2 in which is fitted a head member 3. This head member 3 is screw threaded, as shown at 8 and into these screw threads is fitted a vertically elongated member 6 which serves as a support for the filtering medium, this member 6 being provided with notches or corrugations 6 along its entire extent. Along the corrugations 6 of this elongated member 6 are placed in two layers a filtering material 5 usually consisting of a closely woven fabric or the like, and surrounding this fabric and holding the same in intimate contact with the corrugations, there will be found an outer fabric indicated generally at 7. Formed in the head 3 is an angular bore or passage 4, which has a vertical leg portion communicating at its upper end with the lower end of a bore or passage 4' extending longitudinally upward through the center of the member 6 to a point adjacent the upper end thereof and beyond the plane of the upper end of the filtering material 7. Opening diametrically through the member 6, are a series of lateral branch bores or passages $4^a$, $4^b$ and $4^c$, the intermediate bore or passageway $4^b$ being arranged in right angular relation to the lower bore or passage $4^a$ and the upper bore or passage $4^c$. The bore or passage $4^a$ is disposed in a plane slightly above the lower end of the filtering materials 5 and 7 surrounding the member 6, and the bore or passage $4^c$ in a plane slightly below the upper end of the filtering material, while the intermediate bore or passage $4^b$ is arranged substantially in the plane of the horizontal center of the filtering materials 5 and 7 and the member 6. These branch bores or passages $4^a$, $4^b$ and $4^c$ afford a means for bringing the viscose solution from the vertical bore or passage 4 into contact with substantially the entire area of the filtering fabric. The casing 1 is provided with shoulder 10, at its lower end which acts as a convenient means for holding the casing when it is desired to dismantle the structure. At 9 there is indicated a portion of a nozzle or adapter fitted upon the end of the casing 1 and adapted to project into the coagulating bath.

The device is preferably constructed entirely of glass, and its utilization will be apparent from the following:

Viscose solution is pumped by pump P, or otherwise forced, into filter F from a source of the solution (not shown). It enters the filter by way of the angular bore or passage 4 in head 3 and is forced along the vertical bore or passage 4' in the member 6 where it passes outwardly through these branch passages $4^a$, $4^b$ and $4^c$ and into contact with the filtering fabric 7, the corrugations 6 on the member 6 providing spaces for a substantially uniform distribution of the solution to and the easy passage of the solution through said filter. After passing through the filter the solution enters the space defined between casing 1 and member 5 and is then forced upwardly through the opening 11 and outwardly through the member 9. From member or nozzle 9 the solution passes into the coagulating bath whence it is coagulated or reduced into a more or less solidified condition, in the form of a filament or a like shape. By forming the device entirely of glass, it will be seen that there is provided an element which is entirely unattackable by the liquid, of the coagulating bath, which is visible, and which, upon dismantling, will be readily cleanable. The form of the device shown in the drawings is illustrative only, its scope being connected with that the appended claim.

What I claim is:

A filter of the class described, comprising a casing open at both ends, a filter, a plug seated in the lower end of said casing and having an angular passage therethrough, a member rising centrally from said plug, said member having a vertical passage therein in communication at its lower end with the vertical leg of the passage in said plug and extending beyond the plane of the upper end of said filter, the upper end of the passage in said member being closed, said passage in said member having spaced upper and lower parallel lateral branch passages opening outwardly through the same and into said casing, an intermediate lateral branch passage opening through said body at right angles to the said first named lateral branch passages, said filter comprising a filtering material surrounding said member and secured thereto at points above and below said upper and lower lateral branch passages and corrugations formed in the outer surfaces of said member and extending between the several of the lateral branch passages for distributing the fluid to be filtered to the filtering material.

THOMAS L. KIRBY.